United States Patent Office 2,701,760
Patented Feb. 8, 1955

2,701,760

HERBICIDAL COMPOSITIONS

Allen E. Smith, Oxford, and Albert W. Feldman, North Haven, Conn., assignors to United States Rubber Company, New York, N. Y., a corporation of New Jersey No Drawing. Application January 16, 1952,
Serial No. 266,792

1 Claim. (Cl. 71—2.5)

This invention relates to herbicidal compositions.

The use of herbicides in agriculture is rapidly increasing and has now reached the point where it is common practice to treat the soil either before or after the crop has been planted to eliminate or retard weed growth. Mechanization of the growing of certain crops is limited since row weeding still necessitates the use of hand labor. Selective herbicides that could be applied to the planted row to curtail or eliminate weeds and yet allow the normal development of the crop would be a tremendous impetus to mechanization of the growing of cotton, legumes, and many other crops. Certainly chemical weed control under any system of farming, whether mechanized or not, can provide a means of assuring good crop development with a saving of expensive hand labor. Several requirements on the part of the chemical must be met in order to justify its use as a selective pre-emergence herbicide. Lack of injury to the agronomic crop is, of course, necessary. Further, it is very important that the chemical render a high degree of weed control, even under very adverse conditions, until the agronomic crop has developed to the stage where mechanical cultivation can be practiced.

U. S. Patent 2,556,665 discloses the use of N-aryl phthalamic acids and their alkali salts and esters as plant growth regulants and phytocides. The herbicidal usefulness of these compounds, however is limited because they tend to injure many crops when used in amounts sufficient to give practical weed control.

We have found that the water-insoluble metal salts of N-(1-naphthyl)-phthalamic acid are excellent pre-emergence selective herbicides and give effective weed control without crop injury.

The water-insoluble salts of N-(1-naphthyl)-phthalamic acid may be prepared by treating a water-soluble salt of N-(1-naphthyl)-phthalamic acid with a suitable water-soluble salt of a polyvalent metal in aqueous medium, or by heating a suitable polyvalent metal carbonate, oxide, or hydroxide with N-(1-naphthyl)-phthalamic acid in an inert solvent. The ratio of water-soluble phthalamate salt or the free acid to polyvalent metal compound is not critical, but in general we prefer to use at least one equivalent of the N-(1-naphthyl)-phthalamic acid or water-soluble salt per gram atom of polyvalent-metal ion. For example, 48 g. (0.15 m.) sodium N-(1-naphthyl)-phthalamate in 100 cc. of water was treated with 9 grams (0.08 m.) of calcium chloride dissolved in 200 cc. of water. A pasty product, consisting of crude calcium N-(1-naphthyl)-phthalamate, separated as a white precipitate. The product was washed well with water, and then with a 1:1 mixture of acetone-benzene. Yield, 32 g. or 70% of the theoretical amount. The material did not sinter or melt below 220° C.

Other polyvalent metal salts of N-(1-naphthyl)-phthalamic acid, viz., the zinc, cadmium, cupric and ferric salts, were made in an analogous manner. The cupric salt was blue; the zinc and cadmium salts were white; and the ferric salt was brown.

The water-insoluble or polyvalent metal salts of N-(1-naphthyl)-phthalamic acid may be applied to the ground, before or after planting, in an inert medium, as a dust in admixture with a powdered solid carrier, such as the various mineral silicates, e. g. mica, talc, pyrophyllite and clays, or as an aqueous spray, preferably with the aid of a surface-active dispersing agent in amount effective to disperse the salt in water. Such surface-active dispersing agent may be anionic, non-ionic or cationic, as shown in U. S. Patent 2,556,665. The water-insoluble N-(1-naphthyl)-phthalamates may be admixed with powdered solid carriers, such as mineral silicates, together with a surface-active dispersing agent so that a readily wettable powder may be obtained which may be applied directly to the ground, or which may be shaken up with water to readily prepare an aqueous suspension of the chemical (and powdered carrier) for application to the ground in that form. The water-insoluble N-(1-naphthyl)-phthalamates may be applied to the ground by the aerosol method.

The following illustrates the invention:

EXAMPLE I

Pre-emergence tests in the greenhouse

Eight cc. of 0.25% aqueous solutions or dispersions of N-(1-naphthyl)-phthalamic acid, its sodium salt, various of its water-insoluble polyvalent-metal salts, and calcium N-dodecyl phthalamate (to illustrate the lack of any herbicidal activity in the known polyvalent-metal N-alkyl phthalamates) containing 0.5% of a non-herbicidal surface active dispenrsing agent (condensation product of ethylene oxide with an alkylated phenyl) were added to 62 cc. of water and the dispersions watered onto the surface of the soil in 6 inch clay pots immediately after seeds of the test plant had been sown. Seeds of squash, corn and carrots were tested. The salts were used at a rate of about 10 pounds of N-(1-naphthyl)-phthalamic acid equivalent per acre. The potting soil used contained seeds of a variety of monocotyledonous and dicotyledonous weeds such as: pigweed (Amaranthus sp.), purslane (Portulaca sp.), lamb's-quarters (Chenopodium sp.), quick weed (Galinsoga sp.), chickweed (Stellaria sp.), crabgrass (Digitaria sp.), nut grass (Cyperus sp.). Seedlings from the test seeds emerged in 3 to 6 days after planting. One month after planting, the salts were evaluated for crop injury and weed control. Results are shown in the following table:

| Chemical | Crop Injury | Weed Control |
|---|---|---|
| None (check) | None | None. |
| Cupric N-(1-naphthyl)-phthalamate | Very slight in all cases. | Good. |
| Zinc N-(1-naphthyl)-phthalamate | Very slight in all cases. | Do. |
| Basic Zinc N-(1-naphthyl)-phthalamate. | Very slight in all cases. | Do. |
| Cadmium N-(1-naphthyl)-phthalamate. | None | Fair. |
| Ferric N-(1-naphthyl)-phthalamate | do | Do. |
| Calcium N-(1-naphthyl)-phthalamate | do | Very good. |
| N-(1-naphthyl)-phthalamic acid | Pronounced in all cases. | Do. |
| Sodium N-(1-naphthyl)-phthalamate | Very servere in all cases. | Excellent. |
| Calcium N-dodecyl phthalamate | None | None. |

It is evident from the above table that polyvalent-metal N-(1-naphthyl)-phthalamates can be advantageously used as a pre-emergence weed control in crops that may be injured by the free acid and the alkali salts. The polyvalent metal N-alkyl phthalamate (calcium N-dodecyl phthalamate) was inactive.

EXAMPLE II

Pre-emergence tests in the field

A water suspension of the calcium salt of N-(1-naphthyl)-phthalamic acid was used in pre-emergence field tests on a number of row and field crops. The calcium salt was used at a rate of 10 pounds of N-(1-naphthyl)-phthalamic acid equivalent per acre and was applied with 150 gallons of water and the same surface-active agent used in the tests above. The sodium salt was also used at the rate of 10 pounds acid equivalent per acre, applied in 150 gallons of water containing the same surface-active agent used in the tests above. The suspensions and solutions were sprayed on the top soil when the seeds were planted. Seeds planted were squash, cotton, soybeans and carrots. Seeds of monocotyledonous and dicotyledonous weeds as above were well represented in the soil. One month after planting the salts were evaluated for crop injury and weed control. Results are shown in the following table:

| Chemical | Crop and Degree of Injury | | | | Weed Control |
| --- | --- | --- | --- | --- | --- |
| | Squash | Cotton | Soybean | Carrots | |
| Sodium N-(1-naphthyl)-phthalamate | Severe | Very slight | Very slight | Severe | Excellent. |
| Calcium N-(1-naphthyl)-phthalamate | None | None | None | None | Do. |
| None (control or check) | do | do | do | do | None. |

The above again shows the great superiority of the water-insoluble salts of N-(1-naphthyl)-phthalamic acid as selective herbicides over the water-soluble salts.

Having thus described our invention, what we claim and desire to protect by Letters Patent is:

The method of controlling weeds in soil which comprises treating the soil before emergence of weeds with a herbicidal amount of calcium N-(1-naphthyl)-phthalamate.

References Cited in the file of this patent

UNITED STATES PATENTS

| 2,390,941 | Jones | Dec. 11, 1945 |
| 2,556,665 | Smith et al. | June 12, 1951 |